March 7, 1950     H. J. BUTLER     2,499,845

FLUID PRESSURE OPERATED MASTER CYLINDER

Filed Aug. 24, 1948

INVENTOR.
HENRY JAMES BUTLER
BY
Benj. T. Rauber
ATTORNEY

Patented Mar. 7, 1950

2,499,845

UNITED STATES PATENT OFFICE 2,499,845

FLUID PRESSURE OPERATED MASTER CYLINDER

Henry James Butler, Sutton Coldfield, England, assignor to Dunlop Rubber Company Limited, London, England, a British company Application August 24, 1948, Serial No. 45,921
In Great Britain August 1, 1947

3 Claims. (Cl. 60—54.6)

This invention relates to improvements in hydraulic braking systems, particularly for aircraft.

As a safety precaution in aircraft it is usual to provide an auxiliary braking system in addition to the main braking system so that if for any reason the main braking system should become inoperative the pilot would still be able to control the movement of the aircraft on the ground. If however, the defect should be such that the liquid of the system streams over the braking surface as might occur, for example, if a liquid seal in the moving parts of the brake should be defective, the auxiliary braking surface would likewise be inoperative on account of the lack of friction between the braking surfaces.

This risk according to the invention is reduced by providing a hydraulic pressure system comprising a primary system and a secondary system, pressure liquid from a source of hydraulic pressure being transmitted through a control valve to an intervening device which in turn transmits pressure liquid to the mechanism to be operated. It is desirable to place the intervening device as near to the brakes as is convenient and thus reduce the volume of liquid in the secondary system that can escape on account of, for example, a defective seal.

The object of this invention is to provide a hydraulic braking system that minimises the risk of liquid leaking from the system thereby to make the braking surfaces inoperative. It is a further object of the invention to provide a device in a hydraulic braking system comprising a primary system and a secondary system that will permit the automatic replenishment of any minor liquid leakage from the secondary system.

According to the invention a device for transmitting pressure liquid from a primary pressure liquid system to a secondary pressure liquid system comprises a cylinder, a double acting piston in said cylinder one face operable by the primary pressure liquid and the other face operable by the secondary pressure liquid, a cylindrical operating chamber adjacent the said cylinder said operating chamber having on one side of the primary pressure liquid inlet a spring-controlled non-return valve communicating with the said cylinder and having on the other side of the said inlet a spring-controlled plunger adapted to pump liquid into the secondary pressure system under the action of the primary source of the pressure liquid, and a reservoir adapted to contain liquid adjacent the said operating chamber having an opening communicating with the secondary pressure system so situated that the said opening is closed after a small movement of the said plunger under the action of the primary pressure liquid, whereby the liquid in the secondary pressure system is replenished should any leakage occur.

The invention will now be more particularly described with reference to the accompanying diagrammatic drawing in which—

Figure 1:
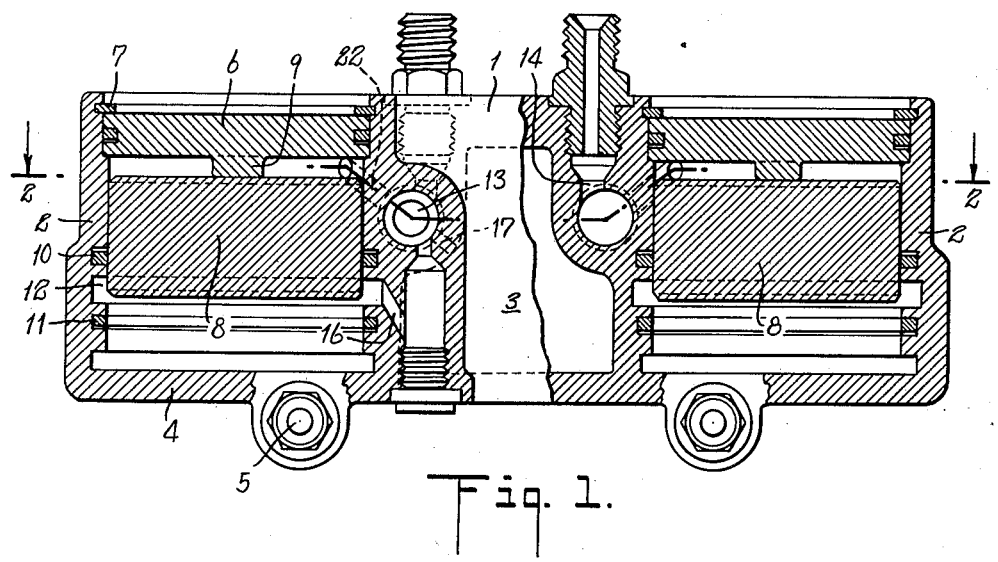
Fig. 1 is an underside sectional plan view through a device suitable for inclusion in the pressure liquid operated independent main and auxiliary brakes of an aircraft wheel.
Figure 2:
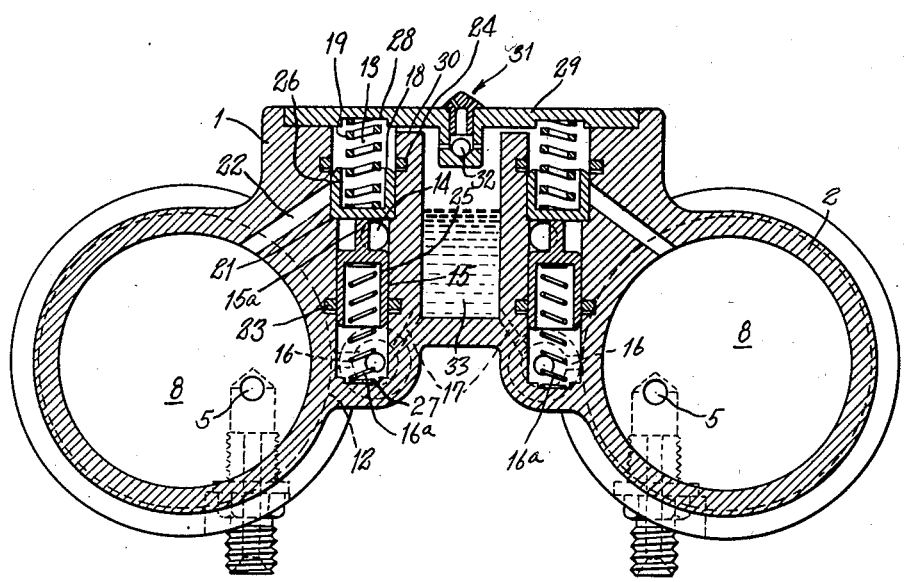
Fig. 2 is a vertical sectional view taken on the dotted lines 2—2 of Fig. 1.

The device comprises a metal casing 1 formed with two cylinders 2 spaced apart side by side with their axes parallel, and between the cylinders is a liquid reservoir 3 to which the cylinders are adapted to be connected as and for the purpose hereinafter described.

For convenience one cylinder and its associated parts will be referred to unless otherwise stated as the other cylinder and its associated parts are similar. The one end 4 of the cylinder is an integral part of the casing and is formed with an outlet passage 5 which is screw-threaded for connection by a pipe to a brake mechanism, and the other end of said cylinder is closed and sealed by a disc 6 retained in the cylinder against a shoulder by an expansible split spring ring. A solid piston 8 works in the cylinder and, when at one end of the cylinder, abuts against a spacing button 9 on the inner face of the disc so as to be spaced from the disc, and when at the other end of the cylinder abuts against said end 4. The cylinder has a circular sealing ring 10 approximately mid-way of its length and another circular sealing ring 11 approximately halfway between the first mentioned sealing ring 10 and the integral end 4 of the cylinder. Centrally between the two sealing rings the cylinder wall is formed with an annular groove 12 and when the piston abuts against the spacing button 9 the piston covers the major part of this groove and provides only a comparatively small width gap between itself and the uncovered edge of the groove, and said gap is for a purpose as will be hereinafter described.

Situated between the cylinder and the reservoir and transversely of said cylinder is an operating chamber 13 of circular cross-section. Communicating with the operating chamber approximately mid-way of its length is an inlet passage 14 extending to the exterior of the casing and screw-threaded at its outer end for connection to a liquid pressure supply pipe connected to a control means having a liquid conveying connection with an accumulator. In the operating chamber at one side of the inlet is a plunger 15 and at the other side near the passage 14 is a valve 18. The plunger 15 has a stem projecting toward the valve 18. A spring 16a presses the plunger 15 toward the valve 18 until stopped by contact of the steam 15a against the valve 18. The end of the chamber 13 on the side of the plunger 15 remote from the inlet is connected by a passage 16 to the annular groove 12 in the cylinder wall. A passage 17 extends from the central reservoir 3 and opens into the operating chamber at a position such that it is only fully uncovered by the plunger 15 when said plunger is in its upper position with the stem 15a abutting the valve 18. The valve 18 is urged by a spring 19 towards the inlet 14 against a stop 21 and in this position prevents pressure liquid from the source from flowing along a passage 22 extending from the operating chamber to the cylinder at the spacing button end of said cylinder. The plunger 15 and the valve 18 reciprocate in sealing rings 23 and 24 respectively which are mounted in the wall of the operating chamber and the remote ends of said plunger and valve are respectively formed with sockets 25 and 26 to house the compression spiral springs 16a and 19. The plunger spring 16a abuts against the end 27 of the operating chamber and the valve spring 19 is stronger than said plunger spring and is located at its end remote from the valve in a circular recess 28 formed in a closure plate 29 attached by screws to the casing 1 of the device.

Whilst the plunger 15 has a close sliding fit in the chamber 13 it has not a fluid-tight fit except where the sealing ring 23 is located. Downward movement of said plunger first substantially seals passage 17 and then by forcing pressure liquid along passage 16 and into the cylinder makes up evaporation losses. Further movement of the plunger substantially seals passage 16 and the liquid in the bottom of the chamber 13, under compression by the plunger, seeps between the plunger and the wall of the cylinder and back through passage 17 to the reservoir. A vent 31 is provided in the closure plate to open into the reservoir and is provided with a ball valve 32 which closes should the device be inverted.

In use the unit is connected in a system such that the outlet 5 of one cylinder is in communication with a main brake mechanism in an aircraft wheel while the outlet 5 of the other cylinder is in communication with an auxiliary brake mechanism in the same wheel. The inlet 14 of one operating chamber is in communication with a manually operable control means and the inlet 14 of the other operating chamber is in communication with another manually operable control means and said two means may be independently operable or may be mechanically linked together to be operated simultaneously. The outlets of a similar unit are connected in like manner to the other wheel and one inlet of said unit is connected to one of the said control means while the other inlet is connected to the other of said control means such that one control means has liquid conveying connections with a brake mechanism in each wheel while the other control means has liquid conveying connections with the other brake mechanism in each wheel. One control means is also in communication with a source of pressure liquid supply and the other control means is also in communication with another source of pressure liquid supply or alternatively the two control means are in communication with a single source of supply.

The operation of the device is as follows, taking into consideration one cylinder only for convenience. The secondary system is fully charged with liquid so that the piston 8 is normally forced against the spacing button 9 due to the customary resilient means in the brake mechanism of the wheel. At the same time the plunger 15 and the valve 18 are spring urged towards the inlet opening in the operating chamber. On admission of the primary pressure liquid to the operating chamber by operation of the appropriate control means the plunger 15 is moved before the valve 18 moves because the plunger spring is weaker than the valve spring. The plunger closes the port 17 in its movement to the end of the stroke, any surplus fluid seeping past the wall of the plunger into the reservoir. When the valve 18 opens it uncovers the passage 22 leading to the spacing button end of the cylinder to admit pressure liquid to that side of the piston. The moving piston transmits pressure liquid to the secondary system and actuates the brakes. When the brakes are released the piston is forced back to the spacing button if there has been no liquid leakage in the secondary system. If there has been a slight leakage as by evaporation or gumming of the liquid so that the piston uncovers the annular groove 12, the movement of the plunger 15 when the primary pressure liquid is applied will make good the deficiency before pressure is applied to the spacing button end of the piston. If however the leakage is such that the annular groove 12 is not uncovered, the deficiency cannot be made good, and if the leakage continues the piston will not move when the braking pressure is relieved and the pilot will have to rely on the remaining braking system to control the aircraft on the ground.

When one brake mechanism in a wheel becomes inoperative the other brake mechanism can still be operated by either using the other control means or, if the two control means are mechanically linked together, by continued use of the common actuating means for said two control means.

It should be appreciated that if severe liquid loss occurs in the secondary system there is no consequent loss in the associated primary system and accumulator because the two systems have no liquid connection with each other.

Having described my invention, what I claim is:

1. A device for transmitting liquid pressure from a primary pressure liquid system to a secondary pressure liquid system comprising a cylinder, a double-acting piston in said cylinder one face operable by the primary pressure liquid and the other face operable by the secondary pressure liquid, a cylindrical operating chamber adjacent the said cylinder, said operating chamber having a primary pressure liquid inlet to its mid portion, a spring-controlled valve in said chamber at one side of said inlet and communicating with the said cylinder and a spring-controlled plunger in said cylinder on the other side of said inlet to pump liquid into the secondary pressure system under the action of the primary source of pressure liquid, and a reservoir adapted to contain liquid adjacent the said operating chamber having an opening communicating with the secondary pressure system so situated that the said opening is closed after a small movement of the said plunger under the action of the primary pressure liquid whereby the liquid in the secondary pressure system is replenished should any leakage occur.

2. A device as claimed in claim 1 wherein the spring controlling the said plunger is weaker than the spring controlling the said non-return valve.

3. A modification of the device claimed in claim 1 for main and auxiliary pressure liquid systems comprising in side by side relationship two cylinders each having a double-acting piston, a cylindrical operation chamber contiguous to each of the said cylinders, and a common reservoir between the said operating chambers.

HENRY JAMES BUTLER.

REFERENCES CITED

The following references are of record in the file of this patent:

UNITED STATES PATENTS

| Number | Name | Date |
|---|---|---|
| 2,329,709 | Fischer | Sept. 21, 1943 |